United States Patent
Kemmler et al.

(10) Patent No.: US 7,040,271 B2
(45) Date of Patent: May 9, 2006

(54) METHOD FOR MAKING IT EASIER TO START AN INTERNAL COMBUSTION ENGINE

(75) Inventors: Roland Kemmler, Stuttgart (DE); Johannes Leweux, Esslingen (DE); Dietmar Schroeer, Remseck (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/418,418

(22) Filed: Apr. 18, 2003

(65) Prior Publication Data

US 2004/0011315 A1   Jan. 22, 2004

(30) Foreign Application Priority Data

Apr. 20, 2002 (DE) ................. 102 17 695

(51) Int. Cl.
*F02N 17/08* (2006.01)
(52) U.S. Cl. .............................. 123/179.18
(58) Field of Classification Search ........ 123/179.18, 123/336, 198 DB
See application file for complete search history.

(56) References Cited

U.S. PATENT DOCUMENTS

| | | | |
|---|---|---|---|
| 3,736,915 A * | 6/1973 | Dickensheets et al. | 123/198 DC |
| 4,090,481 A * | 5/1978 | Gospodar | 123/397 |
| 4,385,598 A * | 5/1983 | Nakajima et al. | 123/432 |
| 4,682,576 A * | 7/1987 | Nakamura et al. | 123/179.18 |
| 4,688,533 A * | 8/1987 | Otobe | 123/337 |
| 5,074,268 A | 12/1991 | Schatz et al. | |
| 5,353,763 A | 10/1994 | Schatz | |
| 5,704,324 A * | 1/1998 | Ichinose et al. | 123/179.18 |
| 5,979,158 A | 11/1999 | Kaiser et al. | |
| 6,032,632 A | 3/2000 | Bolenz et al. | |
| 6,422,184 B1 | 7/2002 | Kreuter | |
| 6,529,815 B1 * | 3/2003 | Hawkins et al. | 701/104 |
| 6,637,394 B1 * | 10/2003 | Marshall et al. | 123/179.3 |
| 6,772,729 B1 * | 8/2004 | Brosseau et al. | 123/308 |
| 6,802,295 B1 * | 10/2004 | Bedwell et al. | 123/198 D |

FOREIGN PATENT DOCUMENTS

| | | |
|---|---|---|
| DE | 37 37 824 | 5/1989 |
| DE | 41 41 482 | 6/1993 |
| DE | 197 05 610 | 12/1997 |
| DE | 197 05 865 | 9/1998 |
| DE | 199 08 435 | 9/2000 |

* cited by examiner

*Primary Examiner*—Henry C. Yuen
*Assistant Examiner*—Arnold Castro
(74) *Attorney, Agent, or Firm*—Kenyon Kenyon LLP

(57) ABSTRACT

In a method for making it easier to start an internal combustion engine having at least one cylinder in which there is at least one piston which is intended to execute an oscillating motion between a top dead center and a bottom dead center, air or a fuel-air mixture is drawn in via an induction line as a result of a movement of the piston toward the bottom dead center. After the bottom dead center has been passed and after the piston has started to move toward the top dead center, the air or the fuel-air mixture is discharged from the cylinder via the induction line. Intake valves are closed at a time which is shifted toward the top dead center. A control element arranged in the induction line closes the induction line after the piston has passed the bottom dead center.

14 Claims, 1 Drawing Sheet

METHOD FOR MAKING IT EASIER TO START AN INTERNAL COMBUSTION ENGINE

CROSS-REFERENCE TO RELATED APPLICATIONS

The present application claims priority to Application No. 102 17 695.7, filed in the Federal Republic of Germany on Apr. 20, 2002, which is expressly incorporated herein in its entirety by reference thereto.

FIELD OF THE INVENTION

The present invention relates to a method for making it easier to start an internal combustion engine having at least one cylinder in which there is at least one piston which is intended to execute an oscillating motion between a top dead center and a bottom dead center.

BACKGROUND INFORMATION

German Published Patent Application No. 197 05 865 describes a method in which the internal combustion engine, during the starting operation, is dragged up to a predetermined, increased speed, and the injection of fuel takes place with a predetermined delay after the activation of the ignition.

The use of starter-generator combinations to start internal combustion engines is described, for example, in German Published Patent Application No. 197 05 610, and with these combinations it is in principle possible to use both belt-driven and what are referred to as integrated starter-generator combinations.

Particularly in modern internal combustion engines, starting aids of this type, in particular the belt-driven starter-generator combinations, are often unable to apply the required driving moment to start the internal combustion engine, the reasons for this being both the higher compression work required to achieve this moment and the in some cases insufficient current intensity of the generators.

Additional control elements in an induction line leading to the internal combustion engine are described in German Published Patent Application No. 37 37 824, German Published Patent Application No. 41 41 482 and German Published Patent Application No. 199 08 435. These publications also describe, inter alia, methods for operating these internal combustion engines.

It is an object of the present invention to provide a method for making it easier to start an internal combustion engine in which reliable and in particular rapid starting of the internal combustion engine may be achieved by a simple arrangement.

SUMMARY

The above and other beneficial objects of the present invention may be achieved by providing a method as described herein.

In an example embodiment of a method according to the present invention, the fact that the air or the fuel-air mixture is discharged from the cylinder while the piston is moving toward the top dead center may reduce the effective compression in the combustion chamber of the cylinder to a considerable extent, leading to a corresponding reduction in the compression work required, with the result that ultimately a lower moment may be required in order to start the internal combustion engine.

According to an example embodiment of the present invention, this may be achieved through the fact that the closure times of the intake valves, for example, through the use of a camshaft adjuster which may be conventional, are shifted a considerable amount toward the top dead center or are in principle in a very late position, and the closure of the induction line, according to an example embodiment of the present invention, may be effected by the separate control element provided in the induction line.

In an example embodiment of a method according to the present invention, the additional switching element is already blocking the incoming flow through the induction line while the piston is moving toward the bottom dead center, i.e., in a relatively early phase, with the result that the air or the fuel-air mixture in the cylinder expands and therefore there may be a relatively low mass of air in the cylinder. The work which is consumed during this expansion is recovered again in the subsequent compression stroke, i.e., during the movement of the piston toward the top dead center, and is converted into kinetic energy for the piston.

The relatively small mass of air in the cylinder which is described above results, as has already been described in the first method, in a low level of real compression inside the combustion chamber, so that once again a considerably lower drive moment may be required to start the internal combustion engine than with conventional starting operations. In this case too, therefore, the use of the control element in the induction line may make it possible to make it easier to start the internal combustion engine, e.g., in terms of the need to drag the internal combustion engine up to the starting speed.

The forgoing example embodiments may use a control element arranged in the induction line to reduce the compression work required inside the corresponding cylinder during the operation of starting the internal combustion engine, in order in this manner to make it easier to start the engine.

In an example embodiment of the present invention, it is possible, where there are a plurality of cylinders and induction lines leading to the cylinders, for each induction line to be closed by a separate control element. This may ensure separate actuation of each individual cylinder in multicylinder internal combustion engines, so that in this case too it may be easier to start the engine.

A method for shutting off an internal combustion engine is also described herein.

Further aspects and refinements of the present invention are described below with reference to the Figures.

DETAILED DESCRIPTION

Figure 1:
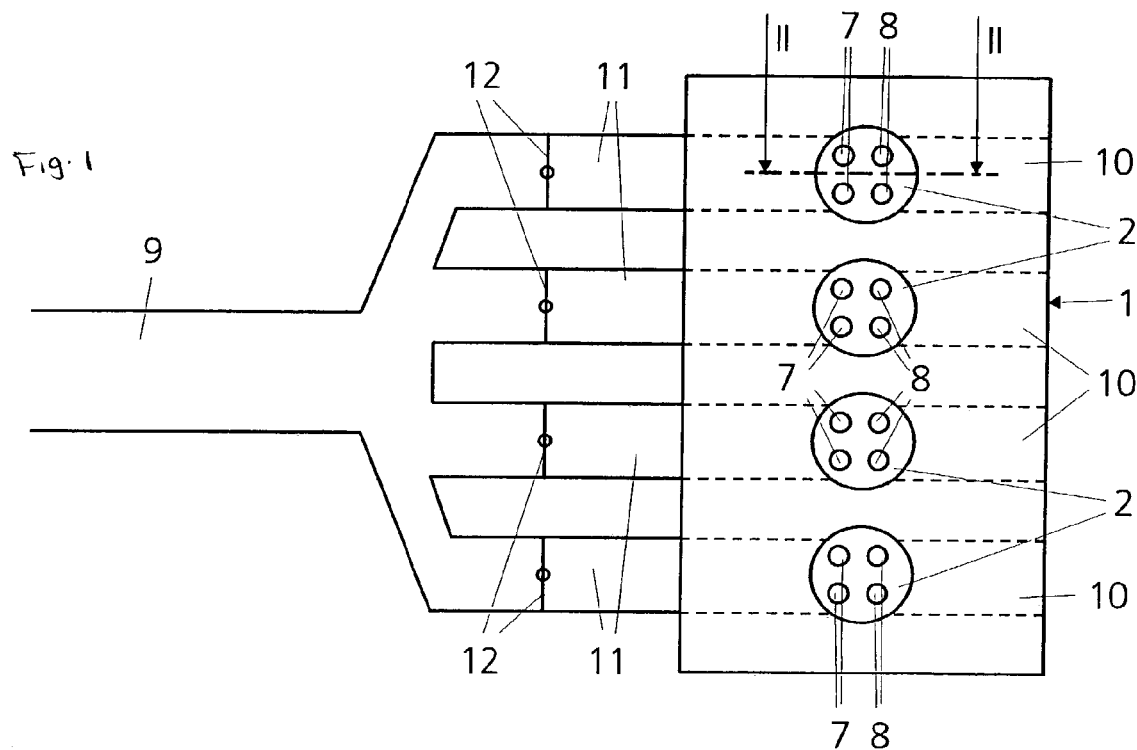
FIG. 1 illustrates an internal combustion engine for carrying out an example embodiment of a method according to the present invention.
Figure 2:
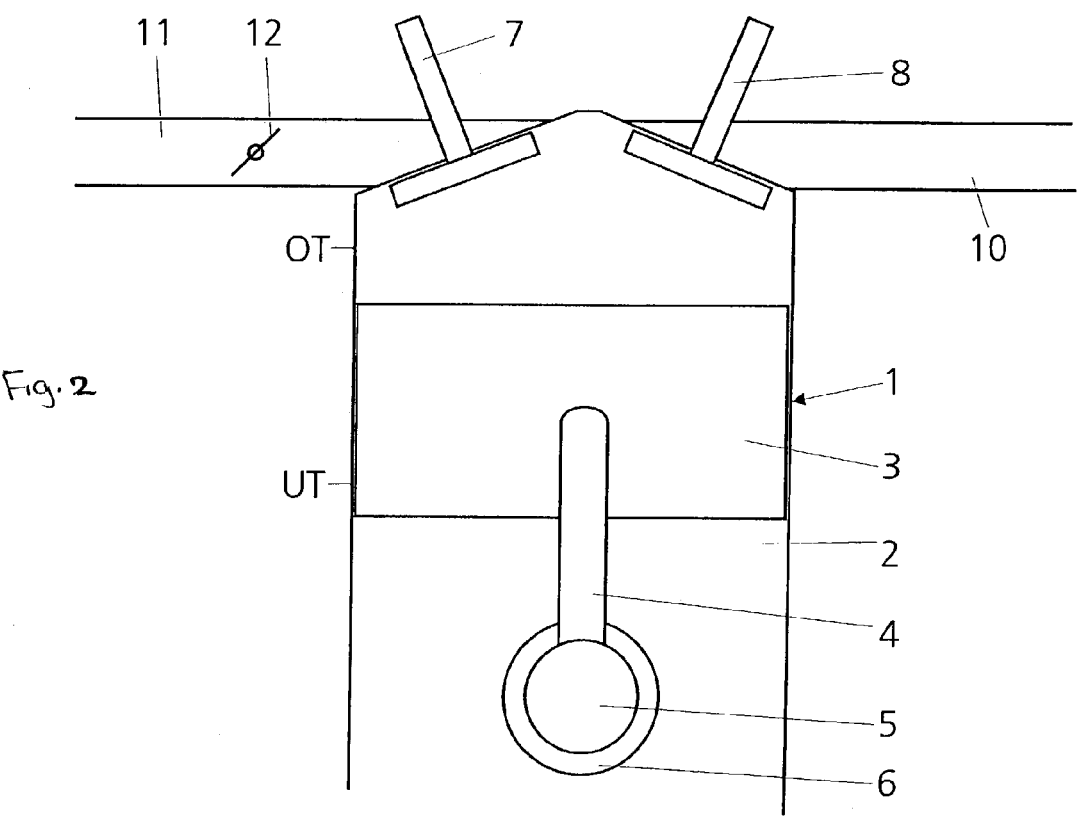
FIG. 2 illustrates a cross-sectional view through the internal combustion engine taken along the line II—II illustrated in FIG. 1.

An internal combustion engine 1 which is diagrammatically illustrated in FIG. 1 and FIG. 2 and operates in accordance with the spark-ignition principle or the diesel principle in the present case has four cylinders 2 with pistons 3 arranged in them in a manner which may be conventional. As illustrated in FIG. 2, the pistons 3, in a manner which may be conventional, execute an oscillating motion, which is denoted by the arrow A, between a top dead center TDC and a bottom dead center BDC. For this purpose, the pistons 3 are connected via respective connecting rods 4 to a crankshaft 5, to which a starter-generator combination 6 is connected. Since the structure of the internal combustion engine 1 thus far may be conventional, details of this structure will not be dealt with further in this respect.

In the present case, each cylinder 2 is assigned two intake valves 7 and two exhaust valves 8. It may also be possible to provide a different number of intake valves 7 and exhaust valves 8. The intake valves 7 are provided for the purpose of opening and closing an induction line 9 with respect to the cylinders 2. The exhaust valves 8 are used to open and close an exhaust line 10 which leads away from the cylinders 2 of the internal combustion engine 1 in a manner which may be conventional. The induction line 9 has a plurality of induction ports 11 which lead to the individual cylinders 2. It may also be possible to provide a different number of induction ports 11, depending on the number of cylinders 2.

In the present case, a control element 12 is arranged in each of the induction ports 11 leading to the individual cylinders 2, and this control element, as explained below, is actuated in such a manner that it may become easier to start the internal combustion engine 1. However, if appropriate, just one control element 12 in the induction line 9 may also be sufficient.

In a first example embodiment of a method used to start the internal combustion engine 1, first of all air or a fuel-air mixture is drawn in via the induction line 9 as a result of a movement of the piston 3 toward the bottom dead center BDC. After the piston has passed the bottom dead center BDC and is moving toward the top dead center TDC, the air or the fuel-air mixture is discharged from the cylinder 2 via the induction line 9. This discharge of the air or of the fuel-air mixture from the cylinder 2 may reduce the effective compression in the cylinder 2.

During the discharge caused by the movement of the piston 3 toward the top dead center TDC, the induction line 9 is closed at a relatively late time by the intake valves 7. The control element 12, which in the present case is arranged in the form of a freely controllable flap arranged in the vicinity of the intake valves 7, then also closes the induction line 9. As a result, the compression is initiated inside the cylinder 2. On account of the lower effective compression, a lower compression work may be required for this purpose, resulting in a lower moment being required to start the internal combustion engine 1 by the starter-generator combination 6. On account of this lower moment, it is also possible to use belt-driven starter-generator combinations 6 for internal combustion engines 1 with relatively large capacities or high levels of compression.

In a second example embodiment of the method for starting the internal combustion engine 1, during the movement of the piston 3 toward the bottom dead center BDC, the control element 12 closes the induction line 9, with the result that the air or the fuel-air mixture in the cylinder 2 expands, and consequently there may be a relatively small mass of air in the cylinder 2. During the above-described expansion, work is consumed and this work is recovered in the subsequent compression stroke, i.e., the movement of the piston 3 toward TDC, when it is converted into kinetic energy for the piston 3.

For this reason and on account of the resulting low level of real compression of the air or fuel-air mixture which has been drawn in, after the bottom dead center BDC has been passed by the piston 3 and after the latter has started to move toward the top dead center TDC, it may be possible to start the internal combustion engine 1 under eased conditions since a considerably lower driving moment may be required to start the internal combustion engine 1.

The method described herein may be used either only during a run-up phase of the internal combustion engine 1, which is followed by an operating mode with complete compression, or may be immediately converted to an operating mode with low-throttle load control after the internal combustion engine 1 has started up.

Furthermore, when shutting off the internal combustion engine 1, e.g., in the case of diesel engines, it may be provided first of all to close the switching elements 12 in the induction ports 11, in order to reach a lower effective compression in the cylinders 2 and in this manner to avoid what is referred to as "shut-off judder".

What is claimed is:

1. A method for making it easier to start an internal combustion engine including at least one cylinder and at least one piston arranged in the cylinder and arranged to oscillate between a top dead center and a bottom dead center, comprising:
   drawing in one of air and a fuel-air mixture via an induction line in accordance with movement of the piston toward the bottom dead center;
   discharging from the cylinder via the induction line the one of the air and the fuel-air mixture after the bottom dead center has been passed by the piston and once the piston has started to move toward the top dead center;
   closing intake valves at a time shifted toward the top dead center; and
   closing the induction line by a control element arranged in the induction line after the piston has moved past the bottom dead center.

2. The method according to claim 1, wherein the internal combustion engine includes a plurality of cylinders and a plurality of induction ports leading from the induction line to the cylinders, the induction line closing step including closing each induction port by a separate control element.

3. The method according to claim 2, wherein the control element includes a freely actuable flap arranged in an immediate vicinity of intake valves assigned to corresponding cylinders.

4. The method according to claim 1, wherein the internal combustion engine includes a starter-generator combination arranged to drive the at least one piston.

5. The method according to claim 1, wherein the induction line is closed by the control element in the induction line closing step only for a sufficient number of working cycles of the piston for the internal combustion engine to reach a predetermined starting speed, the method further comprising switching the internal combustion engine to complete compression after the internal combustion engine reaches the predetermined starting speed.

6. The method according to claim 1, further comprising switching operation of the internal combustion engine to operation with low-throttle load control after the internal combustion engine has started.

7. A method for making it easier to start an internal combustion engine including at least one cylinder and at least one piston arranged in the cylinder and arranged to oscillate between a top dead center and a bottom dead center, comprising:

closing an induction line leading to the internal combustion engine by a control element arranged in the induction line during movement of the piston toward the bottom dead center;

compressing one of air drawn in and a fuel-air mixture in accordance with the closing of the induction line by the control element after the piston has passed the bottom dead center and after the piston has started to move toward the top dead center; and starting the internal combustion engine.

8. The method according to claim 7, wherein the internal combustion engine includes a plurality of cylinders and a plurality of induction ports leading from the induction line to the cylinders, the induction line closing step including closing each induction port by a separate control element.

9. The method according to claim 8, wherein the control element includes a freely actuable flap arranged in an immediate vicinity of intake valves assigned to corresponding cylinders.

10. The method according to claim 7, wherein the internal combustion engine includes a starter-generator combination arranged to drive the at least one piston.

11. The method according to claim 7, wherein the induction line is closed by the control element in the induction line closing step only for a sufficient number of working cycles of the piston for the internal combustion engine to reach a predetermined starting speed, the method further comprising switching the internal combustion engine to complete compression after the internal combustion engine reaches the predetermined starting speed.

12. The method according to claim 7, further comprising switching operation of the internal combustion engine to operation with low-throttle load control after the internal combustion engine has started.

13. A method for shutting off an internal combustion engine including a plurality of cylinders, a plurality of induction lines including separately controlled control elements leading to the cylinders, and a piston arranged in each cylinder and arranged to oscillate between a top dead center and a bottom dead center, comprising:

closing each of the induction lines by respective one of the separately controlled control elements to produce a lower effective compression in the cylinders when the internal combustion engine is being shut off.

14. A method for shutting off a diesel engine including a plurality of cylinders, a plurality of induction lines including control elements leading to the cylinders, and a piston arranged in each cylinder and arranged to oscillate between a top dead center and a bottom dead center, comprising:

closing the induction lines by respective control elements to produce a lower effective compression in the cylinders when the diesel engine is being shut off.

* * * * *